US009399190B2

(12) United States Patent
Horizoe et al.

(10) Patent No.: US 9,399,190 B2
(45) Date of Patent: Jul. 26, 2016

(54) SYSTEM AND METHOD FOR RECOVERING GAS CONTAINING $CO_2$ AND $H_2S$

(75) Inventors: Kouji Horizoe, Tokyo (JP); Shinya Tachibana, Tokyo (JP); Moritoshi Murakami, Tokyo (JP); Masaki Yushima, Hiroshima (JP); Kazuo Ishida, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 374 days.

(21) Appl. No.: 13/989,171

(22) PCT Filed: Sep. 22, 2011

(86) PCT No.: PCT/JP2011/071696
§ 371 (c)(1),
(2), (4) Date: May 23, 2013

(87) PCT Pub. No.: WO2012/070304
PCT Pub. Date: May 31, 2012

(65) Prior Publication Data
US 2013/0247755 A1      Sep. 26, 2013

(30) Foreign Application Priority Data
Nov. 24, 2010  (JP) ................................. 2010-261840

(51) Int. Cl.
*B01D 53/14*       (2006.01)
*C10K 1/08*        (2006.01)
*C10K 1/00*        (2006.01)

(52) U.S. Cl.
CPC ............ *B01D 53/1462* (2013.01); *C10K 1/004* (2013.01); *C10K 1/005* (2013.01);
(Continued)

(58) Field of Classification Search
CPC .................................................... B01D 53/1462
USPC ................................................................ 95/8
See application file for complete search history.

(56) References Cited

U.S. PATENT DOCUMENTS 3,563,695 A * 2/1971 Benson .......................... 423/223
3,563,696 A * 2/1971 Benson .......................... 423/223
(Continued)

FOREIGN PATENT DOCUMENTS

CN       1218711 A      6/1999
CN    101721883 A      6/2010
(Continued)

OTHER PUBLICATIONS

Japanese Decision of a Patent Grant dated Jul. 1, 2014, issued in Japanese Patent Application No. 2010-261840, w/English translation (3 pages).
(Continued)

*Primary Examiner* — Duane Smith
*Assistant Examiner* — Adam W Bergfelder
(74) *Attorney, Agent, or Firm* — Westerman, Hattori, Daniels & Adrian, LLP

(57) ABSTRACT

An absorber that uses a gasified gas containing $CO_2$ and $H_2S$ formed by gasifying coal, for example, as an introduced gas, and that makes the $CO_2$ and $H_2S$ absorbed from the introduced gas by bringing the introduced gas into contact with an absorbent for absorbing $CO_2$ and $H_2S$; an absorbent regenerator-that extracts absorbent that has absorbed $CO_2$ and $H_2S$ from the bottom of the absorber and introduces the absorbent from the top of the absorber, and that regenerates the absorbent by releasing the $CO_2$ and $H_2S$; a second supply line that returns the regenerated absorbent from the regenerator to the absorber; and a third supply line that extracts the absorbent (semi-rich solution) that has absorbed a part of the $CO_2$ and $H_2S$ from the vicinity of the middle of the absorber, and that introduces the semi-rich solution in the vicinity of the middle of the regenerator.

6 Claims, 5 Drawing Sheets

(52) U.S. Cl.
CPC ........ *C10K 1/08* (2013.01); *B01D 2252/20489* (2013.01); *B01D 2256/16* (2013.01); *B01D 2256/20* (2013.01); *B01D 2257/304* (2013.01); *B01D 2257/504* (2013.01); *B01D 2259/65* (2013.01); *Y02C 10/06* (2013.01); *Y02P 20/152* (2015.11)

(56) References Cited

U.S. PATENT DOCUMENTS

| | | | |
|---|---|---|---|
| 4,325,782 A * | 4/1982 | Grunewald et al. | 568/913 |
| 4,997,630 A | 3/1991 | Wagner et al. | |
| 5,413,627 A | 5/1995 | Landeck et al. | |

FOREIGN PATENT DOCUMENTS

| | | | |
|---|---|---|---|
| CN | 101874967 A | | 11/2010 |
| JP | 49-040789 | | 11/1974 |
| JP | 56-084617 A | | 7/1981 |
| JP | 04-021521 B2 | | 4/1992 |
| JP | 2824387 B2 | | 11/1998 |
| JP | 3054654 B2 | | 6/2000 |
| JP | 2010-120013 A | | 6/2010 |

OTHER PUBLICATIONS

Chinese Office Action dated May 28, 2014, issued in corresponding Chinese Patent Application No. 201180052453.3, w/English translation (17 pages).
English Translation of the Written Opinion of PCT/JP2011/071696, mailing date of Nov. 8, 2011 (5 pages).
Chinese Notification of the Decision to Grant a Patent dated Jan. 26, 2015, issued in corresponding CN Patent Application No. 201180052453.3 with English translation (2 pages).
Chinese Notification of Fulfiling of Registration Formality dated Jan. 26, 2015, issued in corresponding CN Patent Application No. 201180052453.3 with English translation (2 pages).
International Search Report of PCT/JP2011/071696, mailing date of Nov. 8, 2011.
Written Opinion of PCT/JP2011/071696, mailing date of Nov. 8, 2011.
Notice of Acceptance dated Apr. 17, 2015, issued in corresponding Australian Patent Application No. 2011333125 (3 pages).

* cited by examiner

US 9,399,190 B2

SYSTEM AND METHOD FOR RECOVERING GAS CONTAINING $CO_2$ AND $H_2S$

FIELD

The present invention relates to a system and method for recovering a gas containing $CO_2$ and $H_2S$ that efficiently recover $H_2S$ from $CO_2$ and $H_2S$ contained in a gasified gas obtained through the gasification of, for example, coal, biomass, or the like performed by a gasification furnace.

BACKGROUND

In the past, a chemical absorption method (using, for example, amine absorbent (for example, an absorbent, such as N-methyl diethanolamine: MDEA)) and a physical absorption method (using a Selexol absorbent that uses, for example, polyethylene glycol dimethyl ethers) have been proposed as a technique that removes acid gases, such as $CO_2$ and $H_2S$, contained in a gasified gas obtained through the gasification of coal or biomass performed by a gasification furnace.

Incidentally, there are following demands in the case of a system such as an IGCC (integrated coal gasification combined cycle) technique.

1) In a power generation system, it is necessary to remove $H_2S$, which is a generation source of $SO_X$, in order to make the discharge of $SO_X$, which is an air pollutant, be lower than a criterion. On the other hand, it is preferable that $CO_2$ is not recovered as much as possible in order to obtain an effect of improving power generation efficiency.

2) Since a case where a recovered gas (off-gas) containing $H_2S$ has a lower flow rate and higher $H_2S$ concentration is advantageous when a chemical product is manufactured from the recovered gas or when $H_2S$ is processed, it is preferable that $H_2S$ can be selectively recovered.

3) In a system where CO shift and CCS (recovery/storage of carbon dioxide) are combined with IGCC, it is necessary to suppress $H_2S$ concentration of $CO_2$, which is recovered in a $CO_2$ recovery process, to about a criterion (for example, 10 to 20 ppm).

4) In order to improve power generation efficiency, it is preferable that the amount of heat energy such as steam to be used be small.

That is, it has been required that $H_2S$ is separated from a gas, which contains $CO_2$ and $H_2S$, efficiently and selectively in terms of heat energy.

Accordingly, an energy saving process for supplying a part of an absorbent, where soluble ingredients are partially diffused in a bursting container (an upper stage of a regenerator), to the lower side from the top of an absorber has been proposed in the past (Patent Literature 1).

CITATION LIST

Patent Literature

Patent Literature 1: Japanese Patent Application Laid-open No. 2010-120013

SUMMARY

Technical Problem

However, the technique disclosed in Patent Literature 1 is effective when the technique is applied to the recovery of $CO_2$ from a gas not containing $H_2S$. However, when the technique is applied to the selective recovery of $H_2S$ from a gas containing $CO_2$ and $H_2S$, $H_2S$ concentration of an absorbent at the lower portion of an absorber is increased. For this reason, the absorption rate of $H_2S$ is significantly lowered, so that a $H_2S$ removal rate and $H_2S$ selectivity deteriorate. For this reason, there is a problem in that the increase of heat energy is caused in order to obtain a desired removal rate.

Accordingly, a means capable of separating $H_2S$ from a gas, which contains $CO_2$ and $H_2S$, efficiently and selectively in terms of heat energy, separately from the absorption of $CO_2$ has been desired in a chemical absorption process.

The invention has been made in consideration of the above-mentioned problems, and an object of the invention is to provide a system and method for recovering a gas containing $CO_2$ and $H_2S$ that efficiently recover $H_2S$ contained in a gasified gas obtained through the gasification of, for example, coal, biomass, or the like performed by a gasification furnace.

Solution to Problem

According to a first aspect of the present invention in order to solve the above problems, there is provided a system for recovering a gas containing $CO_2$ and $H_2S$, the system including: an absorber that uses a gas containing $CO_2$ and $H_2S$ as an introduced gas and makes $CO_2$ and $H_2S$ absorbed from the introduced gas by bringing the introduced gas into contact with an absorbent absorbing $CO_2$ and $H_2S$; an absorbent regenerator that extracts an absorbent, which has absorbed $CO_2$ and $H_2S$, from a bottom of the absorber and introduces the absorbent from a top thereof through a first supply line, and regenerates the absorbent by releasing $CO_2$ and $H_2S$ with the heat of a reboiler; a second supply line through which the regenerated absorbent returns to the absorber; and a third supply line to which the absorbent, which has absorbed a part of $CO_2$ and $H_2S$, is extracted from the vicinity of a middle of the absorber and through which the extracted absorbent is introduced to the vicinity of a middle of the regenerator.

According to a second aspect of the present invention, there is provided the system according to the first aspect, further including: a first heat exchanger which is provided at an intersection between the first and second supply lines and where the absorbent extracted from the bottom of the absorber and having absorbed $CO_2$ and $H_2S$ exchanges heat with the regenerated absorbent; and a second heat exchanger which is provided at the intersection between the third and second supply lines and where the absorbent extracted from the vicinity of the middle of the absorber and having absorbed $CO_2$ and $H_2S$ exchanges heat with the regenerated absorbent, wherein the temperature of the absorbent, which has been subjected to heat exchange, is introduced into the regenerator from the vicinity of the middle of the regenerator, and has absorbed $CO_2$ and $H_2S$, is equal to or higher than the temperature of the absorbent that has been subjected to heat exchange, is introduced into the regenerator from the top of the regenerator, and has absorbed $CO_2$ and $H_2S$.

According to a third aspect of the present invention, there is provided a method of recovering a gas containing $CO_2$ and $H_2S$ using an absorber that recovers $CO_2$ and $H_2S$ from an introduced gas containing $CO_2$ and $H_2S$ and a regenerator, the method including: extracting a part of an absorbent from the vicinity of a middle of the absorber that makes $CO_2$ and $H_2S$ absorbed from the introduced gas, so as to reduce the flow rate of the absorbent flowing downward in a lower portion of the absorber; and regenerating the absorbent by introducing the absorbent, which is extracted from a bottom, into the regenerator from the vicinity of a top of the regenerator and introducing the absorbent, which is extracted from the vicinity of the middle of the absorber, to the vicinity of a middle of the regenerator.

According to a fourth aspect of the present invention there is provided the method according to the third aspect, wherein the absorbents, which are extracted from the bottom and the vicinity of the middle of the absorber and have absorbed $CO_2$ and $H_2S$, exchange heat with the regenerated absorbent that is regenerated in the regenerator, and the temperature of the absorbent, which has been subjected to heat exchange, is introduced into the regenerator from the vicinity of the middle of the regenerator, and has absorbed $CO_2$ and $H_2S$, is equal to or higher than the temperature of the absorbent that has been subjected to heat exchange, is introduced into the regenerator from the top of the regenerator, and has absorbed $CO_2$ and $H_2S$.

Advantageous Effects of Invention

According to the invention, a part of an absorbent is extracted from the vicinity of a middle of the absorber through a third supply line so that the flow rate of the absorbent flowing downward in a lower portion of the absorber is reduced. Accordingly, the amount of absorbed $H_2S$ is not substantially reduced and the amount of absorbed $CO_2$ is reduced, so that the selective separation property of $H_2S$ is improved and the amount of reboiler heat in a regenerator is reduced.

BRIEF DESCRIPTION OF DRAWINGS

FIG. 1-2 is a schematic view where an example of conditions of temperature/pressure of the system for recovering a gas containing $CO_2$ and $H_2S$ according to a first embodiment is added.

FIG. 2-1 is a diagram comparing the distillation enthalpy of a recovery system using a basic process in the related art with the distillation enthalpy of the recovery system according to the embodiment.

FIG. 2-2 is a schematic view illustrating the number of theoretical stages of a regenerator.

DESCRIPTION OF EMBODIMENTS

The invention will be described in detail below with reference to the drawings. Meanwhile, the invention is not limited by this embodiment. Further, components of the following embodiments include components that can be easily supposed by those skilled in the art or substantially the same components.

First Embodiment

Figure 1:
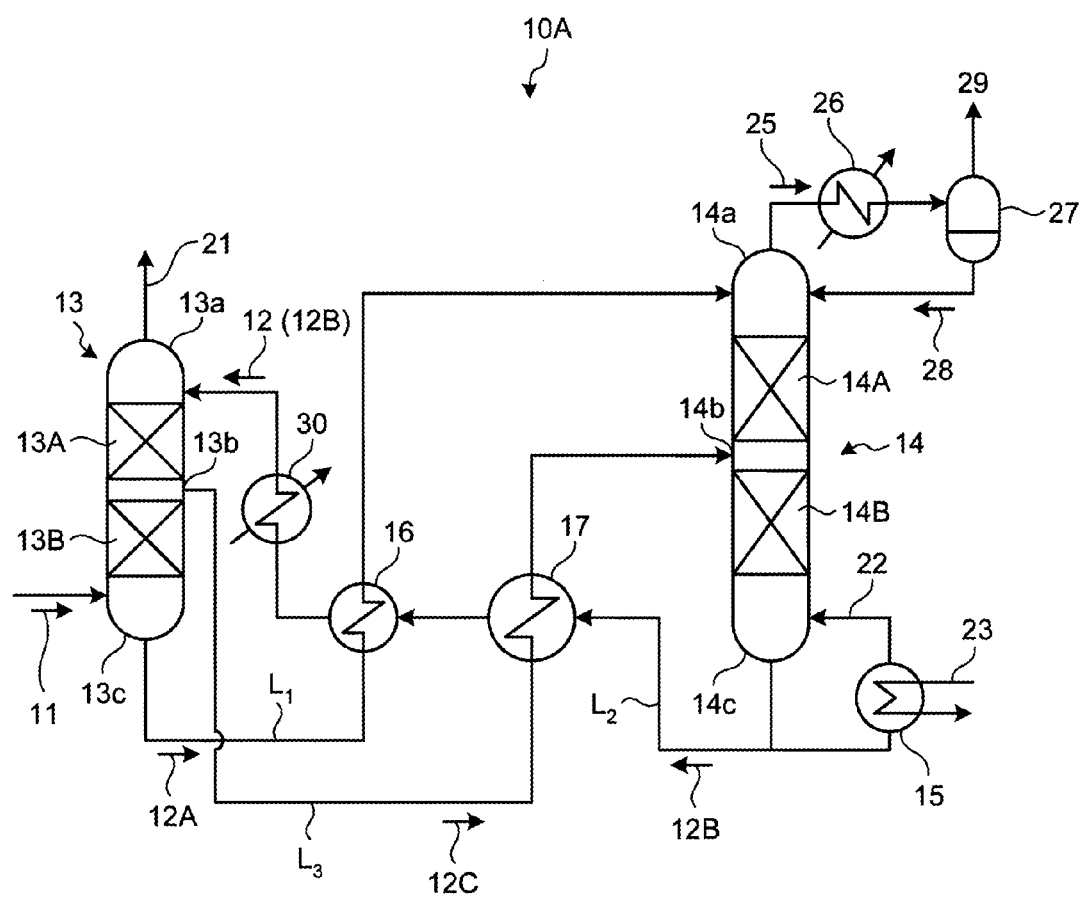
FIG. 1-1 is a schematic view of a system for recovering a gas containing $CO_2$ and $H_2S$ according to a first embodiment.

A system for recovering a gas containing $CO_2$ and $H_2S$ according to an embodiment of the invention will be described with reference to the drawing. FIG. 1-1 is a schematic view of a system for recovering a gas containing $CO_2$ and $H_2S$ according to a first embodiment.

As illustrated in FIG. 1-1, a system 10A for recovering a gas containing $CO_2$ and $H_2S$ according to this embodiment includes an absorber 13, an absorbent regenerator (hereinafter, referred to as a "regenerator") 14, a second supply line $L_2$, a third supply line $L_3$, a first heat exchanger 16, and a second heat exchanger 17. The absorber 13 uses a gasified gas, which contains $CO_2$ and $H_2S$ obtained from a gasification furnace or the like for gasifying, for example, coal, biomass, or the like, as an introduced gas 11, and makes $CO_2$ and $H_2S$ absorbed from the introduced gas 11 by bringing the introduced gas 11 into contact with an absorbent 12 that absorbs $CO_2$ and $H_2S$. The regenerator 14 extracts an absorbent (rich solution) 12A, which has absorbed $CO_2$ and $H_2S$, from a bottom 13c of the absorber 13, and introduces the absorbent 12A from a top 14a thereof through a first supply line $L_1$, and regenerates the absorbent 12 by releasing $CO_2$ and $H_2S$ with the heat of a reboiler 15. A regenerated absorbent (lean solution) 12B is extracted to the second supply line $L_2$ from a bottom 14c of the regenerator 14, and the regenerated absorbent 12B returns to a top 13a of the absorber 13 through the second supply line $L_2$. An absorbent (semi-rich solution) 12C, which has absorbed a part of $CO_2$ and $H_2S$, is extracted to the third supply line $L_3$ from the vicinity of a middle 13b of the absorber 13 and the extracted semi-rich solution 12C is introduced to the vicinity of a middle 14b of the regenerator 14 through the third supply line $L_3$. The first heat exchanger 16 is provided at the intersection between the first supply line $L_1$ and the second supply line $L_2$, and the rich solution 12A exchanges heat with the lean solution 12B at the first heat exchanger 16. The second heat exchanger 17 is provided at the intersection between the third supply line $L_3$ and the second supply line $L_2$, and the semi-rich solution 12C exchanges heat with the lean solution 12B at the second heat exchanger 17.

In this system, the absorbent (lean solution) 12B, which is regenerated by the removal of $CO_2$ and $H_2S$ in the regenerator 14, is reused as the absorbent 12.

In a purification method using the system 10A for recovering a gas containing $CO_2$ and $H_2S$, the gasified gas, which is obtained from a gasification furnace for gasifying coal, biomass, or the like, is sent to a gas cooler (not illustrated), is cooled by cooling water in the gas cooler, and is introduced into the absorber 13 as the introduced gas 11.

The absorber 13 is provided with filling portions 13A and 13B therein. When the introduced gas 11 and the absorbent 12 pass through these filling portions 13A and 13B, the contact efficiency between the introduced gas 11 and the absorbent 12 is improved. Meanwhile, a plurality of filling portions may be provided, and it may be possible to make the introduced gas 11 and the absorbent 12 come into contact with each other by, for example, a spraying method, a liquid column method, a plate method, or the like besides a filling method.

In the absorber 13, the introduced gas 11 comes into contact with, for example, the amine-based absorbent 12 and $CO_2$ and $H_2S$ contained in an exhaust gas 11 are absorbed in the absorbent 12 by a chemical reaction. Accordingly, a purified gas 21 from which $CO_2$ and $H_2S$ have been removed is released to the outside of the system. An absorbent having absorbed $CO_2$ and $H_2S$ is also referred to as a "rich solution" 12A. The rich solution 12A is heated by the heat exchange with the absorbent (lean solution) 12B, which is regenerated in the absorbent regenerator 14, at the first heat exchanger 16 through a rich solution pump (not illustrated). Then, the heated rich solution 12A is supplied to the absorbent regenerator 14.

When being introduced into the absorbent regenerator 14, which includes filling portions 14A and 14B, from the vicinity of the top 14a of the absorbent regenerator 14 and flowing downward in the absorbent regenerator 14, the rich solution 12A subjected to heat exchange reacts endothermically with vapor 22 generated from the reboiler 15, releases most of $CO_2$ and $H_2S$, and is regenerated. The absorbent from which a part or most of $CO_2$ and $H_2S$ have been released in the absorbent regenerator 14 is referred to as a "semi-lean solution". When reaching the lower portion of the absorbent regenerator 14, the semi-lean solution becomes an absorbent from which almost all of $CO_2$ and $H_2S$ have been removed. This absorbent, which is regenerated by the removal of almost all of $CO_2$ and $H_2S$, is referred to as the "lean solution" 12B. This lean solution 12B is indirectly superheated by saturated vapor 23 in the reboiler 15, and generates the vapor 22.

Further, $CO_2$ and $H_2S$ gases 25, which are released from the rich solution 12A and the semi-lean solution in the absorbent regenerator 14 and contain vapor, are discharged from the top 14a of the absorbent regenerator 14; the vapor is condensed by a condenser 26; water 28 is separated by a separation drum 27; and $CO_2$ and $H_2S$ gases 29 are discharged to the outside of the system. As a result, the $CO_2$ and $H_2S$ gases are recovered. The water 28, which is separated by the separation drum 27, is supplied to the upper portion of the absorbent regenerator 14.

The regenerated absorbent (lean solution) 12B is cooled by exchanging heat with the semi-rich solution 12C at the second heat exchanger 17, and is then cooled by exchanging heat with the rich solution 12A at the first heat exchanger 16. Subsequently, the pressure of the lean solution 12B is increased by a lean solvent pump (not illustrated). Then, after being further cooled by a lean solvent cooler 30, the lean solution 12B is supplied to the absorber 13 again and is reused as the absorbent 12.

Further, the temperature of the absorbent (semi-rich solution) 12C, which has been subjected to heat exchange, is introduced into the regenerator 14 from the vicinity of the middle 14b of the regenerator 14, and has absorbed $CO_2$ and $H_2S$, is set to be equal to or higher than the temperature of the absorbent (rich solution) 12A that has been subjected to heat exchange at the second heat exchanger 17, is introduced into the regenerator 14 from the top 14a of the regenerator 14, and has absorbed $CO_2$ and $H_2S$.

The reason for this is as follows: since the temperature of the middle 14b is made to be higher than the temperature of the top 14a of the regenerator 14 by the heat of the vapor 22 generated from the reboiler 15, the temperature of the semi-rich solution 12C, which is introduced into the middle 14b, needs to be equal to or higher than the temperature of the absorbent introduced into the top 14a so that the heat loss of the semi-rich solution 12C is not generated.

In this embodiment, a part of the absorbent is extracted from the vicinity of the middle 13b, which is positioned below the uppermost stage of the absorber 13, by the third supply line $L_3$. Meanwhile, the temperature, the pressure, the flow rate, $CO_2$ concentration, and $H_2S$ concentration of the introduced gas to be introduced are measured, and the optimal extraction position and the optimal amount of the solution to be extracted are determined in comprehensive consideration of these conditions.

The extracted semi-rich solution 12C is heated by exchanging heat with a high-temperature lean solution 12B, which is discharged from the bottom 14c of the regenerator 14, at the second heat exchanger 17, and is supplied to the vicinity of the middle 14b of the regenerator 14, more preferably, to the lower side of the middle 14b.

Incidentally, $H_2S$ and $CO_2$ contained in the introduced gas 11 are absorbed with $H_2S$ and $CO_2$ by the absorbent 12 in the absorber 13.

As in the invention, when a part of the absorbent 12 is extracted from the vicinity of the middle 13b of the absorber 13 by the third supply line $L_3$ and the flow rate of the absorbent, which flows downward in the lower portion of the absorber 13, is reduced, the absorption rate of $CO_2$ is lower since gas-side material transfer predominates in the case of $H_2S$ and liquid-side material transfer predominates in the case of $CO_2$.

Accordingly, as the amount of absorbed $CO_2$ is reduced, that is, the $CO_2$ concentration of the absorbent is reduced, the amount of absorbed $H_2S$ is increased to that extent.

Even in consideration of the reduction of the amount of absorbed $H_2S$ that is caused by the reduction of the flow rate of the absorbent, the amount of absorbed $H_2S$ is not substantially reduced.

Accordingly, it is possible to improve the selectivity of $H_2S$.

When the rich solution 12A of which $CO_2$ concentration and $H_2S$ concentration are high, is introduced into the regenerator 14 from the top 14a of the regenerator 14 and the semi-rich solution 12C of which $CO_2$ concentration and $H_2S$ concentration are lower than those of the rich solution 12A is heated to a temperature that is equal to or higher than the temperature of the rich solution 12A and is then supplied to the vicinity of the middle 14b of the regenerator 14 or a portion below the middle 14b, it is possible to reduce the amount of heat of the reboiler 15. Accordingly, it is possible to reduce the vapor consumption of the reboiler 15.

Figures 1, 2:
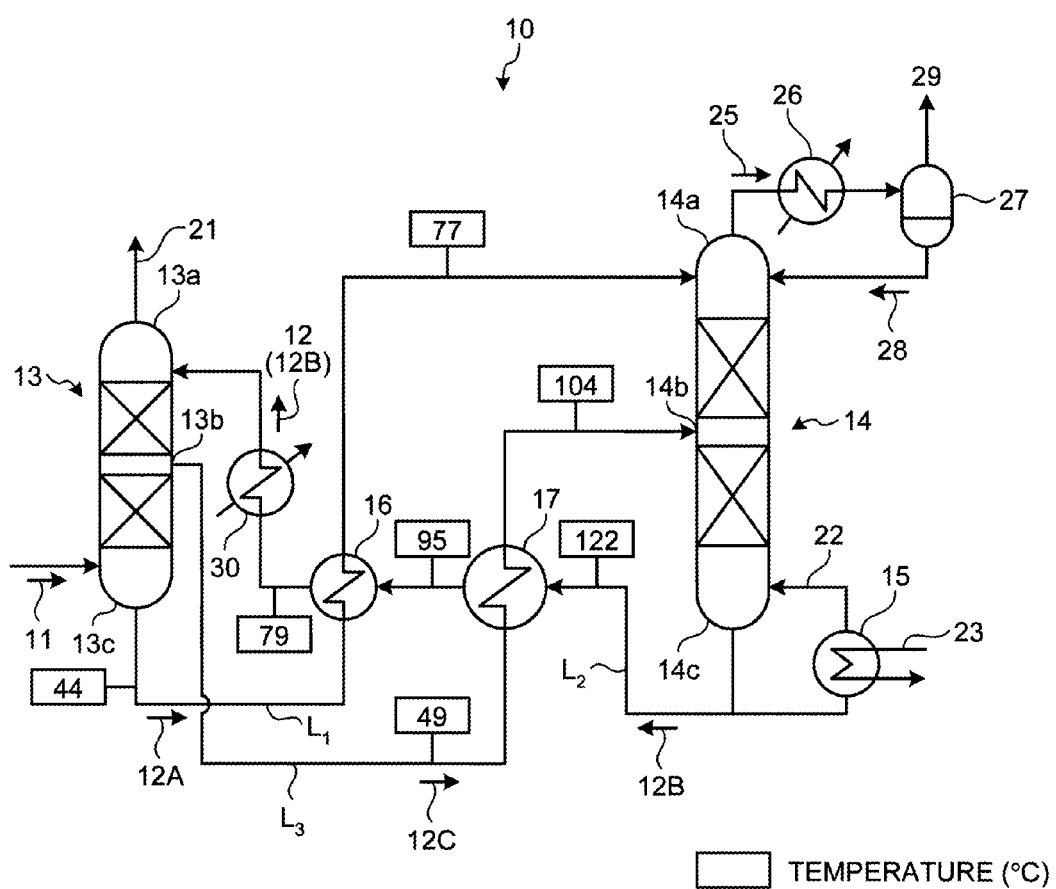
Figures 1, 2:
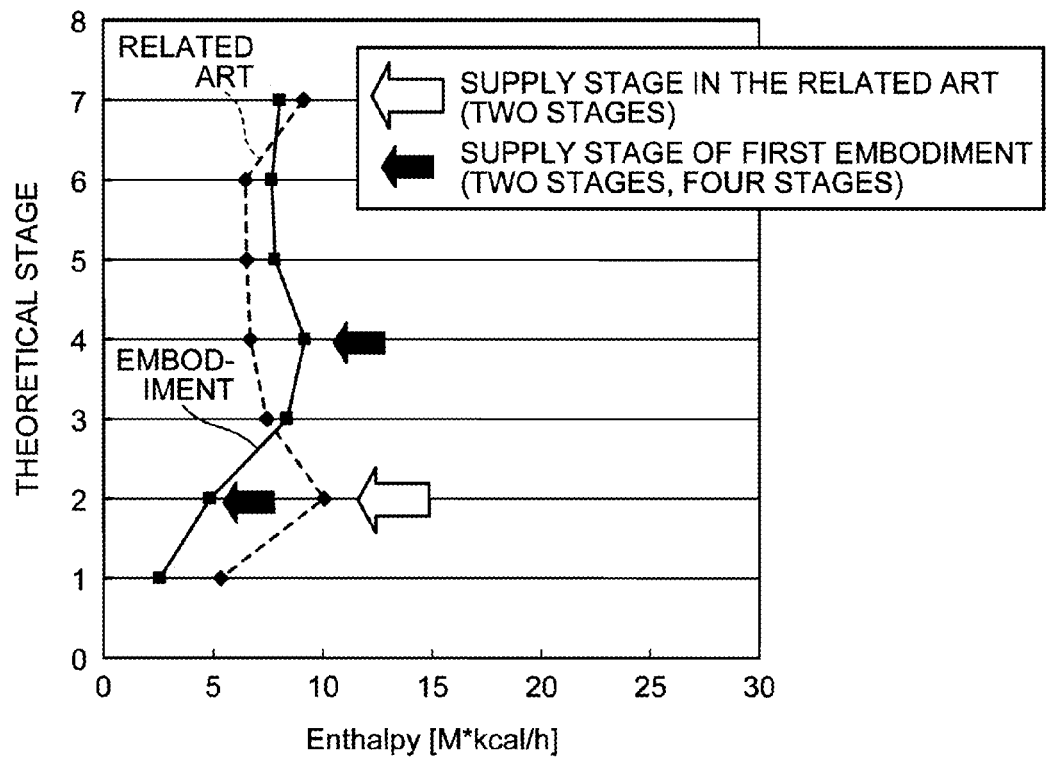
Figure 2:
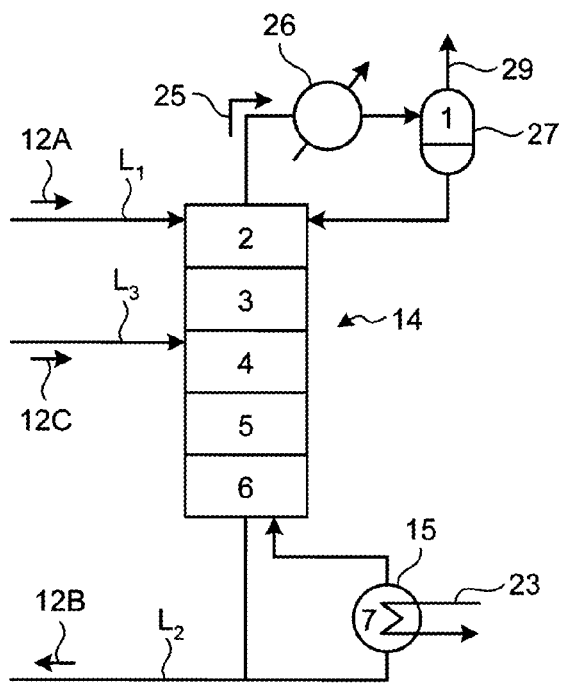

FIG. 1-2 is a schematic view where an example of conditions of temperature/pressure of the system for recovering a gas containing $CO_2$ and $H_2S$ according to the first embodiment is added.

As illustrated in FIG. 1-2, the introduced gas 11 is introduced into the absorber 13.

The absorbent 12 (lean solution 12B) is introduced into the absorber 13 so as to face the introduced gas 11, and absorbs $CO_2$ and $H_2S$.

Since this absorption is an exothermic reaction, the temperature of the semi-rich solution 12C extracted from the vicinity of the middle 13b of the absorber 13 is 49° C. Meanwhile, the temperature of the rich solution 12A extracted from the bottom 13c is 44° C.

The rich solution 12A and the semi-rich solution 12C exchange heat with the high-temperature (122° C.) lean solution 12B at the first and second heat exchangers 16 and 17, respectively, so that the temperature of the rich solution 12A becomes 77° C. and the rich solution 12A is introduced into the regenerator 14 from the top 14a of the regenerator 14. Further, the temperature of the semi-rich solution 12C becomes 104° C., and the semi-rich solution 12C is introduced into the regenerator 14 from the vicinity of the middle 14b of the regenerator 14.

Accordingly, the amount of reboiler heat at the regenerator 14 is reduced.

FIG. 2-1 is a diagram comparing the distillation enthalpy of a recovery system using a basic process in the related art with the distillation enthalpy of the recovery system according to the embodiment. FIG. 2-2 is a schematic view illustrating the number of theoretical stages of the regenerator.

Here, the method in the related art is a method that extracts all of an absorbent from the bottom of an absorber 13, introduces the entire amount of a solution into the regenerator 14 from a top 14a of the regenerator 14, and regenerates the entire amount of the solution.

As illustrated in FIG. 2-1, in the recovery system according to the embodiment, the distillation enthalpy, that is, necessary heat energy at the upper stage of the regenerator is significantly reduced as compared to the case in the related art, but the increase of distillation enthalpy is relatively small at the lower stage of the regenerator. As a result, it was confirmed that the amount of heat necessary for the reboiler 15 and the condenser 26 is reduced. Meanwhile, the reduction of absorbed heat, which is caused by the reduction of the amount of recovered $CO_2$, also contributes to the reduction of the amount of necessary heat.

As described above, according to the invention, it is possible to reduce the amount of reboiler heat, so that it is possible to reduce the heat energy of the entire system.

Second Embodiment

Figure 3:
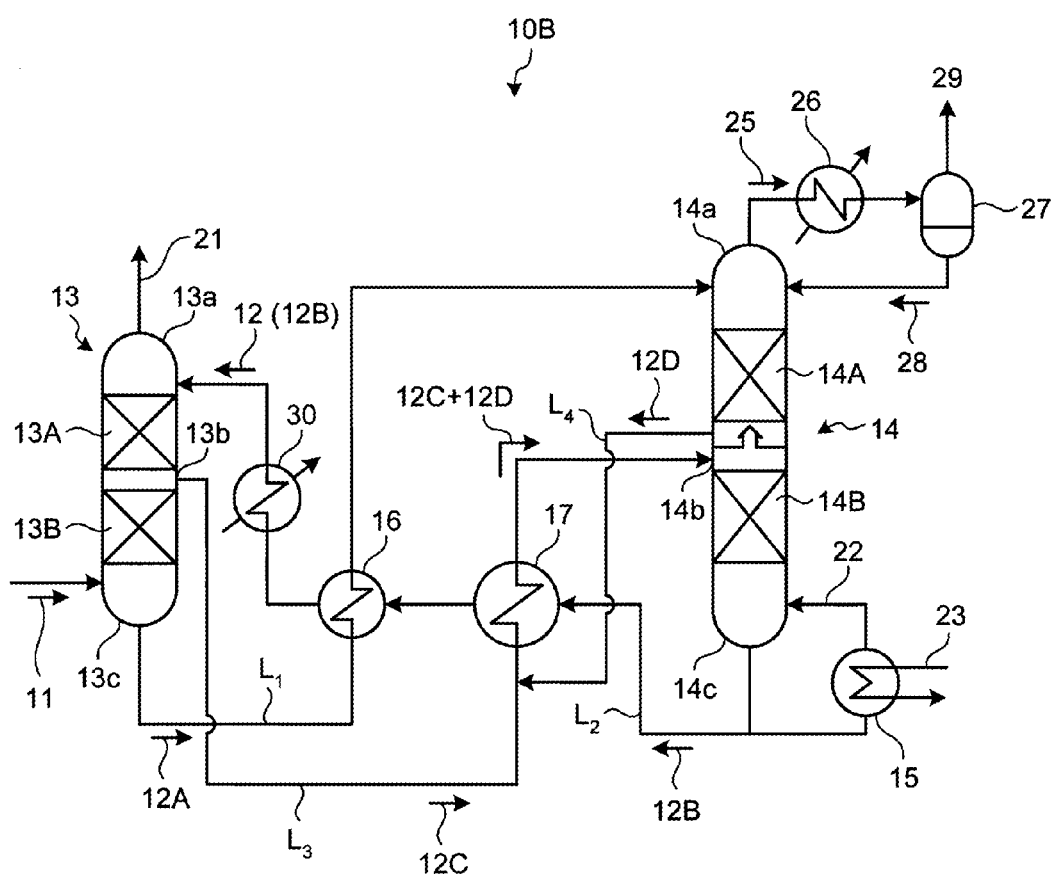
FIG. 3 is a schematic view of a system for recovering a gas containing $CO_2$ and $H_2S$ according to a second embodiment.

A system for recovering a gas containing CO2 and H2S according to an embodiment of the invention will be described with reference to the drawing. FIG. 3 is a schematic view of a system for recovering a gas containing CO2 and H2S according to a second embodiment. Meanwhile, the same components as the components of the first embodiment illustrated in FIGS. 1-1 and 1-2 are denoted by the same reference numerals and the description thereof will not be made.

As illustrated in FIG. 3, a system 10B for recovering a gas containing CO2 and H2S according to this embodiment includes an extraction line $L_4$, to which the entire amount of an absorbent (semi-lean solution) 12D that is regenerated by the release of a part of CO2 and H2S is extracted from the vicinity of a middle 14b of a regenerator 14, in the system 10A for recovering a gas containing CO2 and H2S according to the first embodiment. Further, the extraction line $L_4$ joins the front stage side of the second heat exchanger 17 provided on the third supply line L3 so that the extracted semi-lean solution 12D and the semi-rich solution 12C are mixed to each other here and are subjected to heat exchange at the second heat exchanger 17, and the solution is introduced to the lower filling portion 14B of the regenerator 14.

Accordingly, the heat energy of the reboiler 15 is reduced as compared to the past.

Table 1 illustrates the comparison between the first related art (a recovery system that extracts the entire amount of an absorbent from a bottom and introduces the entire amount of an absorbent into a regenerator from the top of the regenerator), the second related art (a system provided with a diffusion tower, Patent Literature 1), the recovery system of the first embodiment, and the recovery system of the second embodiment, in terms of the amount of reboiler heat of a regenerator, the amount of recovered $CO_2$, the amount of recovered $H_2S$, and $H_2S$ selectivity (the amount of recovered $H_2S$/the amount of recovered $CO_2$).

Meanwhile, the relative ratios thereof obtained when the related art 1 corresponds to 100 were compared with each other.

TABLE 1

|  | First related art | Second related art | First embodiment | Second embodiment |
| --- | --- | --- | --- | --- |
| Amount of reboiler heat of regenerator | 100 | 120 | 88 | 96 |
| Amount of recovered CO2 | 100 | 104 | 92 | 92 |
| Amount of recovered H2S | 100 | 99 | 100 | 100 |

TABLE 1-continued

|  | First related art | Second related art | First embodiment | Second embodiment |
| --- | --- | --- | --- | --- |
| H2S selectivity (amount of recovered H2S/amount of recovered CO2) | 100 | 95 | 109 | 109 |

As illustrated in Table 1, it was confirmed that the amount of reboiler heat of each of the first and second embodiments is smaller than that in the first related art. Further, it was possible to reduce the amount of recovered $CO_2$ while maintaining the amount of recovered $H_2S$. As a result, the improvement of $H_2S$ selectivity (the amount of recovered $H_2S$/the amount of recovered $CO_2$) was confirmed.

Third Embodiment

Figure 4:
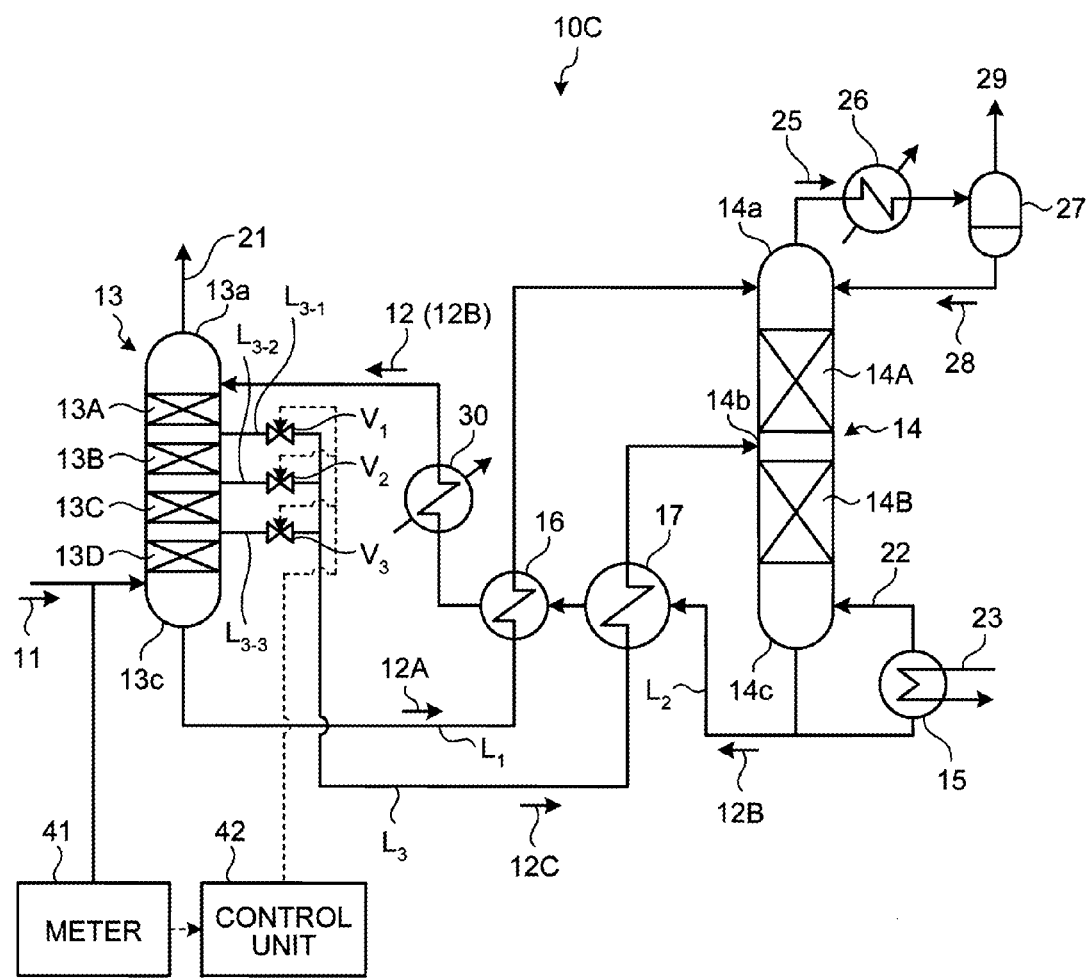
FIG. 4 is a schematic view of a system for recovering a gas containing $CO_2$ and $H_2S$ according to a third embodiment.

A system for recovering a gas containing $CO_2$ and $H_2S$ according to an embodiment of the invention will be described with reference to the drawing. FIG. 4 is a schematic view of a system for recovering a gas containing $CO_2$ and $H_2S$ according to a third embodiment. Meanwhile, the same components as the components of the first embodiment illustrated in FIGS. 1-1 and 1-2 are denoted by the same reference numerals and the description thereof will not be made.

As illustrated in FIG. 4, a system 10C for recovering a gas containing $CO_2$ and $H_2S$ according to this embodiment includes an absorber 13, which is provided with a plurality of absorption portions 13A to 13D so that a plurality of extraction positions are formed, in the system 10A for recovering a gas containing $CO_2$ and $H_2S$ according to the first embodiment.

The temperature, the pressure, the flow rate, $CO_2$ concentration, and $H_2S$ concentration of an introduced gas 11 are measured by a meter 41, and the optimal extraction position and the optimal amount of the solution to be extracted are determined by a controller.

In this embodiment, three extraction positions of a semi-rich solution 12C are provided and a plurality of lines $L_{3-1}$, $L_{3-2}$, and $L_{3-3}$ and valves $V_1$ to $V_3$ are provided.

Since the pressure of the absorber 13 is high, the amount of a solution to be extracted can be adjusted through the adjustment of openings of the valves $V_1$ to $V_3$ or the adjustment of the flow rate of a pump (not illustrated).

Further, the conditions of the introduced gas 11 are measured, and a gas flow rate and the amount of reboiler heat, which are to be obtained when a target value of $H_2S$ concentration of a purified gas 21 is satisfied, are calculated. In this calculation, the extraction positions and extraction flow rate ($m^3$/h) of an absorbent are obtained.

The optimum solution of the extraction condition of an absorbent is determined by a control unit 42, and the control unit 42 controls the instruction of the change of the extraction positions (the opening and closing of the valves).

Next, the control unit 42 adjusts the extraction flow rate of the semi-rich solution 12C by performing the instruction of the adjustment of the openings of the valves or the adjustment of the flow rate of the pump.

Accordingly, it is possible to optimize $H_2S$ removal performance, $H_2S$ selectivity (gas flow rate), and heat energy.

Accordingly, when the conditions of the introduced gas 11 are changed due to the change of, for example, the kind of coal, the $H_2S$ concentration of the purified gas 21 is also significantly changed. However, in this case, it is possible to optimize the extraction condition of the semi-rich solution 12C without modifying the facilities by controlling the extraction position of the semi-rich solution 12C and the amount of the semi-rich solution 12C to be extracted, by this embodiment.

As described above, according to this embodiment, it is possible to easily change the extraction condition of an absorbent and to satisfy target performance even though the conditions of an introduced gas are changed.

REFERENCE SIGNS LIST 10A, 10B, 10C SYSTEM FOR RECOVERING GAS CONTAINING $CO_2$ AND $H_2S$
11 INTRODUCED GAS
12 ABSORBENT
12A RICH SOLUTION
12B LEAN SOLUTION
12C SEMI-RICH SOLUTION
12D SEMI-LEAN SOLUTION
13 ABSORBER
14 ABSORBENT REGENERATOR (REGENERATOR)
15 REBOILER
16 FIRST HEAT EXCHANGER
17 SECOND HEAT EXCHANGER

The invention claimed is:

1. A system for recovering a gas containing $CO_2$ and $H_2S$, the system comprising:
an absorber that uses a gas containing $CO_2$ and $H_2S$ as an introduced gas and makes $CO_2$ and $H_2S$ absorbed from the introduced gas by bringing the introduced gas into contact with an absorbent absorbing $CO_2$ and $H_2S$,
the absorber includes:
a bottom portion from which the absorbent having absorbed $CO_2$ and $H_2S$ is extracted as a rich solution;
a middle portion from which the absorbent having absorbed $CO_2$ and $H_2S$ is extracted as a semi-rich solution; and
a top portion to which lean solution is introduced;
an absorbent regenerator that regenerates the rich solution and the semi-rich solution by releasing $CO_2$ and $H_2S$ with the heat of a reboiler,
the absorbent regenerator includes:
a top portion to which the rich solution is supplied;
a middle portion to which the semi-rich solution is supplied; and
a bottom portion from which the regenerated rich solution and the semi-rich solution are extracted as the lean solution;
a first supply line that connects between the bottom portion of the absorber and the top portion of the absorbent regenerator to supply the rich solution from the bottom portion of the absorber to the top portion of the absorbent regenerator,
a second supply line that connects between the bottom portion of the absorbent regenerator and the top portion of the absorber to supply the lean solution from the bottom portion of the absorbent regenerator to the top portion of the absorber;
a third supply line that connects between the middle portion of the absorber and the middle portion of the absorbent regenerator to supply the semi-rich solution from the middle portion of the absorber to the middle portion of the absorbent regenerator;
a first heat exchanger which is provided at an intersection between the first and second supply lines and where the rich solution is heat-exchanged with the lean solution; and
a second heat exchanger which is provided at the intersection between the third and second supply lines and where the semi-rich solution is heat-exchanged with the lean solution,
wherein the first heat exchanger is provided downstream of the second heat exchanger with respect to the second supply line,
wherein the temperature of the semi-rich solution in the third supply line downstream of the second heat exchanger is equal to or higher than the temperature of the rich solution in the first supply line downstream of the first heat exchanger; and
wherein the top portion, the middle portion and the bottom portion of the absorbent regenerator are in communication with each other.

2. The system according to claim 1, further comprising:
a meter that measures temperature, pressure, flow rate, $CO_2$ concentration, and $H_2S$ concentration of the introduced gas to be introduced; and
a control unit that determines the amount of the semi-rich solution to be extracted in consideration of these conditions, wherein
the absorber further includes:
a plurality of absorption portions and
a plurality of extraction ports from which a plurality of semi-rich solutions are extracted as the semi-rich solution,
the third supply line includes:
a plurality of lines having one ends connected to the plurality of extraction ports, respectively; and
a plurality of valves interposed in the plurality of lines respectively, and
the control unit is configured to adjust openings of the plurality of valves based on the determination.

3. The system according to claim 1, further comprising an extraction line that is connected between the vicinity of the middle portion of the regenerator and the third supply line upstream of the second heat exchanger and from which a semi-lean solution of the regenerator is extracted and mixed with the semi-rich solution.

4. A method of recovering a gas containing $CO_2$ and $H_2S$ using an absorber that recovers $CO_2$ and $H_2S$ from an introduced gas containing $CO_2$ and $H_2S$ and a regenerator, the method comprising:
bringing the introduced gas into contact with an absorbent absorbing $CO_2$ and $H_2S$;
first extracting the absorbent having absorbed $CO_2$ and $H_2S$ from a bottom portion of the absorber as a rich solution;
second extracting the absorbent having absorbed $CO_2$ and $H_2S$ from a middle portion of the absorber as a semi-rich solution;
introducing a lean solution to a top portion of the absorber;
first supplying the rich solution to a top portion of the regenerator;
first supplying the semi-rich solution to a middle portion of the regenerator;
regenerating the rich solution and the semi-rich solution by releasing $CO_2$ and $H_2S$ using heat;
extracting the regenerated rich solution and semi-rich solution as the lean solution;

returning the lean solution to the top portion of the absorber;

first heat-exchanging the rich solution with the lean solution; and second heat-exchanging the semi-rich solution with the lean solution, wherein the first heat-exchanging is performed downstream of the second heat-exchanging with respect to the flow of the lean solution, wherein the temperature of the semi-rich solution after the second heat-exchanging is equal to or higher than the temperature of the rich solution after the first heat-exchanging, and wherein the top portion, the middle portion and the bottom portion of the absorbent regenerator are in communication with each other.

5. The method according to claim 4, further comprising:

measuring temperature, pressure, flow rate, $CO_2$ concentration, and $H_2S$ concentration of the introduced gas to be introduced; and determining the amount of the semi-rich solution to be extracted in consideration of these conditions, wherein the second extracting the absorbent includes:

extracting a plurality of semi-rich solutions as the semi-rich solution from a plurality of extraction ports of the absorber; and adjusting the amounts of the plurality of semi-rich solutions based on the determination.

6. The method according to claim 4, further comprising:

extracting a semi-lean solution from the vicinity of the middle portion of the regenerator to mix the extracted semi-lean solution and the semi-rich solution.

* * * * *